(12) United States Patent
Lou et al.

(10) Patent No.: US 12,317,080 B2
(45) Date of Patent: May 27, 2025

(54) METHOD AND APPARATUS FOR DETECTING ARBITRARY ACCOUNT PASSWORD RESET LOGIC VULNERABILITY, AND MEDIUM

(71) Applicant: DBAPPSECURITY CO., LTD, Zhejiang (CN)

(72) Inventors: Yu Lou, Zhejiang (CN); Yuan Fan, Zhejiang (CN)

(73) Assignee: DBAPPSECURITY CO., LTD, Zhejiang (CN)

( * ) Notice: Subject to any disclaimer, the term of this patent is extended or adjusted under 35 U.S.C. 154(b) by 278 days.

(21) Appl. No.: 18/027,913

(22) PCT Filed: Jun. 8, 2021

(86) PCT No.: PCT/CN2021/098852
§ 371 (c)(1),
(2) Date: Mar. 22, 2023

(87) PCT Pub. No.: WO2022/062478
PCT Pub. Date: Mar. 31, 2022

(65) Prior Publication Data
US 2023/0370846 A1    Nov. 16, 2023

(30) Foreign Application Priority Data
Sep. 22, 2020    (CN) .......................... 202011002902.0

(51) Int. Cl.
*H04L 9/40*    (2022.01)
*H04W 12/033*    (2021.01)
(Continued)

(52) U.S. Cl.
CPC ......... *H04W 12/12* (2013.01); *H04W 12/033* (2021.01); *H04W 12/61* (2021.01)

(58) Field of Classification Search
CPC ... H04W 12/12; H04W 12/033; H04W 12/61; H04L 63/1416; H04L 63/08; H04L 63/1425; H04L 63/1433
See application file for complete search history.

(56) References Cited

U.S. PATENT DOCUMENTS

| | | | |
|---|---|---|---|
| 2014/0337957 A1* | 11/2014 | Feekes | H04L 63/18 726/9 |
| 2015/0358306 A1 | 12/2015 | Adams et al. | |
| 2018/0227288 A1* | 8/2018 | Zhu | G06F 21/602 |

FOREIGN PATENT DOCUMENTS

| | | |
|---|---|---|
| CN | 107896218 A | 4/2018 |
| CN | 109246094 A | 1/2019 |

(Continued)

OTHER PUBLICATIONS

International Search Report for PCT/CN2021/098852 mailed Sep. 8, 2021, ISA/CN.
(Continued)

*Primary Examiner* — Izunna Okeke
(74) *Attorney, Agent, or Firm* — Yue (Robert) Xu; Apex Attorneys at Law, LLP

(57) ABSTRACT

Disclosed are a method and apparatus for detecting a logic vulnerability allowing arbitrary password reset for an account, and a computer readable storage medium. The method includes: invoking a preset identification program to determine whether a request for a verification code is initiated in a to-be-detected webpage; obtaining, from a front-end page, a response packet sent in response to the request for a verification code, and determining whether there is a short message service (SMS) verification code in the response packet, on determining that a request for a verification code is initiated in the to-be-detected webpage; and; and determining that the logic vulnerability allowing arbitrary password reset for an account exists in the to-be- (Continued)

detected webpage, on determining that there is an SMS verification code in the response packet.

16 Claims, 2 Drawing Sheets

(51) Int. Cl.
*H04W 12/12* (2021.01)
*H04W 12/61* (2021.01)

(56) References Cited

FOREIGN PATENT DOCUMENTS

| CN | 109460661 A | 3/2019 |
|----|----|----|
| CN | 112165473 A | 1/2021 |
| EP | 3716564 A1 | 9/2020 |
| WO | 2019114784 A1 | 6/2019 |

OTHER PUBLICATIONS

Yangyangwithgnu, Arbitrary User Password Reset (six): There is a state parameter affecting subsequent logic in the answer, Fly Progress, CSDN Jun. 6, 2018, pp. 2,4-5.

Arthur Killer at Vulnerability Box Security Research Team, Analysis of Common Logic Vulnerabilities in Web Security Testing (Practical Part) , Aug. 31, 2016 (Aug. 31, 2016) pp. 1-4.

Chen Yi-fu, Research and Practice of Code Security Audit Method based on PHP, Communications TP-r.hnology vol. 53 No. 7 Jul. 2020.

Yangyangwithgnu, Random User Password Reset (3): User Confusion, Fly Progress, CSDN Jun. 5, 2018, pp. 4-5.

\* cited by examiner

METHOD AND APPARATUS FOR DETECTING ARBITRARY ACCOUNT PASSWORD RESET LOGIC VULNERABILITY, AND MEDIUM

CROSS REFERENCE OF RELATED APPLICATION

The application is the national phase of International Application No. PCT/CN2021/098852, titled "METHOD AND APPARATUS FOR DETECTING ARBITRARY ACCOUNT PASSWORD RESET LOGIC VULNERABILITY, AND MEDIUM", filed on Jun. 8, 2021, which claims priority to Chinese Patent Application No. 202011002902.0, titled "METHOD AND APPARATUS FOR DETECTING ARBITRARY ACCOUNT PASSWORD RESET LOGIC VULNERABILITY, AND MEDIUM", filed on Sep. 22, 2020 with the China National Intellectual Property Administration, both of which are incorporated herein by reference in its entirety their entireties.

FIELD

The present disclosure relates to the field of webpage detection, and in particular to a method and an apparatus for detecting a logic vulnerability allowing arbitrary password reset, for an account, and a computer-readable storage medium.

BACKGROUND

With the rapid development of computer technology and complication of business logics, a possibility of a logic vulnerability allowing arbitrary password reset for an account in a website page is increasing. The logic vulnerability allowing arbitrary password reset for an account refers to that some logic branches cannot process a request normally or correctly since a program logic of a request form in a webpage is less rigorous or too complicated. The arbitrary password reset for an account is a type of business logic vulnerability causing severe hazard. In a case that there is the logic vulnerability allowing arbitrary password reset for an account in the webpage, an attacker may forge a user and reset a login password of the user account. By resetting the password of the user account, the attacker may further steal or tamper user information of the user, or carry out other actions which bring potential risks for information security of the user. For example, in a case that an SMS verification code is sent to a front-end page via a verification code interface of a mobile phone, the attacker can obtain the SMS verification code without checking the SMS verification code on the mobile phone, and thereby reset a password, which indicates that there is a logic vulnerability allowing arbitrary password reset in the present webpage.

In a conventional technology, existence of the logic vulnerability allowing arbitrary password reset in a to-be-detected webpage is detected generally by a technician checking source code of the to-be-detected webpage manually in combination with technical experience of the technician. However, the method in the conventional technology requires a large amount of human resources, and cannot detect the logic vulnerability allowing arbitrary password reset comprehensively and accurately due to difference among technical levels of technicians.

Therefore, how to detect existence of a logic vulnerability allowing arbitrary password reset for an account comprehensively and accurately with a reduced consumption of human resources is attracting the attention of those skilled in the art.

SUMMARY

In view of this, an objective of the present disclosure is to provide a method for detecting a logic vulnerability allowing arbitrary password reset for an account, with which existence of the logic vulnerability allowing arbitrary password reset for an account can be detected comprehensively and accurately with a reduced consumption of human resources. Another objective of the present disclosure is to provide a computer-readable storage medium and an apparatus for detecting a logic vulnerability allowing arbitrary password reset for an account, both of which have the beneficial effects as described above.

In order to solve the above technical problem, a method for detecting a logic vulnerability allowing arbitrary password reset for an account is provided according to an embodiment of the present disclosure. The method includes: invoking a preset identification program to determine whether a request for a verification code is initiated in a to-be-detected webpage; obtaining, from a front-end page, a response packet sent in response to the request for a verification code, and determining whether there is a short message service (SMS) verification code in the response packet, on determining that a request for a verification code is initiated in the to-be-detected webpage; and determining that the logic vulnerability allowing arbitrary password reset for an account exists in the to-be-detected webpage, on determining that there is an SMS verification code in the response packet.

In an embodiment, after the obtaining, from a front-end page, a response packet sent in response to the request for a verification code, and determining whether there is an SMS verification code in the response packet, the method further includes: determining whether a request for password reset is initiated in the to-be-detected webpage, on determining that there is no SMS verification code in the response packet; replacing first preset user information in the request for password reset with second preset user information, to update the request for password reset, on determining that a request for password reset is initiated in the to-be-detected webpage; and determining whether the logic vulnerability allowing arbitrary password reset for an account exists in the to-be-detected webpage, based on whether a first response corresponding to the updated request for password reset is obtained In an embodiment, the method further includes: replacing an SMS verification code in the request for password reset with a random verification code, to update the request for password reset, on not receiving the first response; and determining whether the logic vulnerability allowing arbitrary password reset for an account exists in the to-be-detected webpage, based on whether a second response corresponding to the updated request for password reset is obtained.

In an embodiment, the method further includes: determining whether the second response is determined within a preset time period; and determining that the logic vulnerability allowing arbitrary password reset for an account exists in the to-be-detected webpage, on determining that the second response is not determined within the preset time period.

In an embodiment, after obtaining the second response within the preset time period, the method further includes:

determining a target random verification code corresponding to the second response; performing a password reset operation for a plurality of times by using the request for password reset corresponding to the target random verification code, to obtain a plurality of third responses; and determining, based on the third responses, whether the logic vulnerability allowing arbitrary password reset for an account exists in the to-be-detected webpage.

In an embodiment, a process of generating the SMS verification code, the first preset user information, and the second preset user information includes: generating at least one of the SMS verification code, the first preset user information, or the second preset user information through a code receiving platform.

In an embodiment, the method further includes: recording a time instant when it is determined that the logic vulnerability allowing arbitrary password reset for an account exists in the to-be-detected webpage.

In order to solve the above technical problems, an apparatus for detecting a logic vulnerability allowing arbitrary password reset for an account is provided according to the present disclosure. The apparatus includes a first detection module, a second detection module, and a first determination module. The first detection module is configured to invoke a preset identification program to determine whether a request for a verification code is initiated in a to-be-detected webpage, and trigger the second detection module on determining that a request for a verification code is initiated in the to-be-detected webpage. The second detection module is configured to obtain, from a front-end page, a response packet sent in response to the request for a verification code, determine whether there is a short message service (SMS) verification code in the response packet, and trigger the first determination module on determining that there is an SMS verification code in the response packet. The first determination module is configured to determine that the logic vulnerability allowing arbitrary password reset for an account exists in the to-be-detected webpage.

In order to solve the above technical problems, an apparatus for detecting arbitrary account password reset logic vulnerability is further provided according to the present disclosure. The apparatus includes: a memory storing a computer program, and a processor. The computer program, when executed by the processor, configures the apparatus to implement the method for detecting a logic vulnerability allowing arbitrary password reset for an account.

In order to solve the above technical problems, a computer-readable storage medium is provided according to the present disclosure. The computer-readable storage medium stores a computer program. The computer program, when executed by a processor, implements the method for detecting a logic vulnerability allowing arbitrary password reset for an account.

In the method for detecting a logic vulnerability allowing arbitrary password reset for an account according to the embodiments of the present disclosure, a preset identification program is invoked to determine whether a request for a verification code is initiated in the to-be-detected webpage, and it is determined whether there is an SMS verification code in the response packet of the front-end page. Thereby, it can be determined whether the logic vulnerability allowing arbitrary password reset for an account exists in the to-be-detected webpage. With the method, manual detection by technicians is avoided, so that human resources are saved. The logic vulnerability allowing arbitrary password reset for an account has impacts on execution of service logic in the to-be-detected webpage. Therefore, determining whether the logic vulnerability allowing arbitrary password reset for an account exists in the to-be-detected webpage based on whether there is the SMS verification code in the response packet of the front-end page can obtain a more comprehensive and accurate result.

The apparatus for detecting a logic vulnerability allowing arbitrary password reset for an account and the computer-readable storage medium are further provided in the present disclosure in order to solve the technical problems. The apparatus and the computer-readable storage medium both have the same beneficial effects as mentioned above.

BRIEF DESCRIPTION OF THE DRAWINGS

In order to more clearly explain the technical solutions in the embodiments of the present disclosure or in the conventional technology, the drawings used in the description of the embodiments or the conventional technology are briefly introduced hereinafter. It is apparent that the drawings in the following description illustrate only some embodiments of the present disclosure. Other drawings can be obtained by those skilled in the art based on the provided drawings without any creative effort.

DETAILED DESCRIPTION

The technical solutions in the embodiments of the present disclosure will be described clearly and completely hereinafter in combination with the drawings in the embodiments of the disclosure. It is apparent that the described embodiments are only part of the embodiments of the present disclosure, rather than all of the embodiments. Based on the embodiments of the present disclosure, all other embodiments obtained by those skilled in the art without creative efforts shall fall within the protection scope of the present disclosure.

According to an aspect of the present disclosure, a method for detecting a logic vulnerability allowing arbitrary password reset for an account is provided, with which a logic vulnerability allowing arbitrary password reset for an account can be detected comprehensively and accurately with a reduced the consumption of human resources. According to another aspect of the present disclosure, an apparatus for detecting a logic vulnerability allowing arbitrary password reset for an account, and a computer-readable storage medium are provided, both of which have beneficial effects as mentioned above.

In order to enable those skilled in the art to better understand the technical solutions of the present disclosure, the present disclosure is described in further detail in conjunction with the accompanying drawings and specific embodiments hereinafter.

Figure 1:
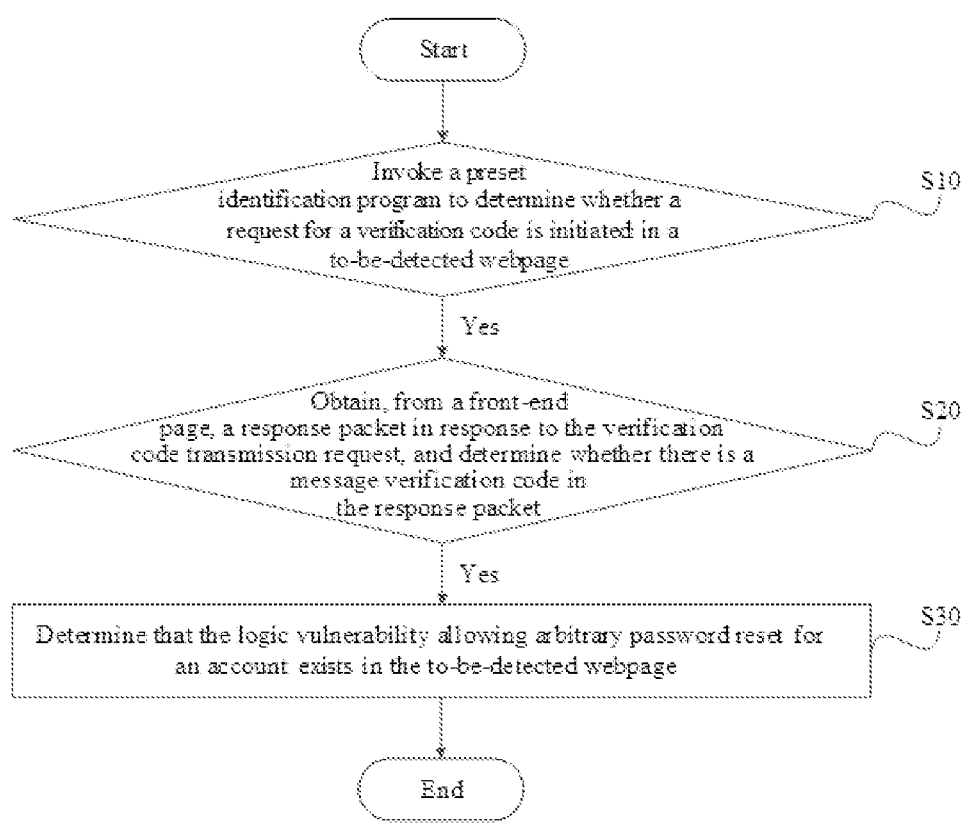
FIG. 1 is a flow chart of a method for detecting a logic vulnerability allowing arbitrary password reset for an account according to an embodiment of the present disclosure.

FIG. 1 is a flow chart of a method for detecting a logic vulnerability allowing arbitrary password reset for an account according to an embodiment of the present disclosure. Reference is made to FIG. 1, the method includes steps S10 to S30 as follows.

In S10, a preset identification program is invoked to determine whether a request for a verification code is initiated in a to-be-detected webpage.

In S20, on determining that the request for a verification code is initiated in the to-be-detected webpage, a response packet in response to the request for a verification code is obtained from a front-end page, and it is determined whether there is a short message service (SMS) verification code in the response packet.

In S30, it is determined that the logic vulnerability allowing arbitrary password reset for an account exists in the to-be-detected webpage, on determining that there is an SMS verification code in the response packet.

In an embodiment, the identification program is preset. The identification program includes a program for identifying a request for a verification code and a program for identifying an SMS verification code. A process of determining whether there is an SMS verification code in the response packet through the program for identifying a request for a verification code is described below.

It is determined whether both a string "send" and a string "sms" are included in a file name of a Uniform Resource Locator (URL) of the to-be-detected webpage where a request form is located.

It is determined whether a first request parameter exists, in a case that both the string "send" and the string "sms" are included in the file name of the URL of the to-be-detected webpage.

It is determined whether there is first preset user information in the first request parameter, in a case that the first request parameter exists. The first preset user information includes a mobile phone number and other information, which is not limited here.

It is determined whether a response corresponding to the request for a verification code is a text or json information, in a case that there is first preset user information in the first request parameter.

In a case that the response is a text or json information, it is determined whether the response includes one of the following individual strings: "1", "true", "ok", and "success". It is determined that the request for a verification code is initiated in a case that at least one of the individual strings is included in the response. It is determined that no request for a verification code is initiated in a case that none of the individual strings is included in the response.

On determining that a request for a verification code is initiated in the to-be-detected webpage, a response packet in response to the request for a verification code is obtained from the front-end page, and it is determined whether there is an SMS verification code in the response packet.

In an implementation, a process of determining whether there is a verification code in the response packet is as follows.

First, the following variables are defined: count=0, index=1, maxCount=0, and checkCode="", where count indicates a quantity of consecutive numeric characters, index indicates a character pointed to, maxCount indicates a maximum number of consecutive numeric characters, and checkCode indicates an SMS verification code that is determined. The identification starts from the character indicated by the index. The index is updated as index=index+1 after each access to a character. The count is updated as count=count+1 in a case that the character is a digit character. In a case that the character is a non-digit character, it is determined whether count>maxCount is satisfied. In a case that the count>maxCount is satisfied, the maxCount is updated as maxCount=count, the string of consecutive numeric characters is recorded to the checkCode, and count is set to 0. Since the SMS verification code for resetting the password is generally a string of 5 to 6 digits, it is determined whether the maxCount is equal to 5 or 6. In a case that the maxCount is equal to 5 or 6, the SMS verification code is the string indicated by the checkCode.

In an implementation, existence of the SMS verification code in the response packet indicates that the SMS verification code can be obtained from the front-end page without using a mobile phone. In this case, it is determined that the logic vulnerability allowing arbitrary password reset for an account exists in the to-be-detected webpage.

In the method for detecting a logic vulnerability allowing arbitrary password reset for an account according to the embodiments of the present disclosure, a preset identification program is invoked to determine whether a request for a verification code is initiated in the to-be-detected webpage, and it is determined whether there is an SMS verification code in the response packet of the front-end page. Thereby, it can be determined whether the logic vulnerability allowing arbitrary password reset for an account exists in the to-be-detected webpage. With the method, manual detection by technicians is avoided, so that human resources are saved. The logic vulnerability allowing arbitrary password reset for an account has impacts on execution of service logic in the to-be-detected webpage. Therefore, determining whether the logic vulnerability allowing arbitrary password reset for an account exists in the to-be-detected webpage based on whether there is the SMS verification code in the response packet of the front-end page can obtain a more comprehensive and accurate result.

On the basis of the above embodiments, the technical solution is further illustrated and improved in this embodiment. In this embodiment, after the response packet in response to the request for a verification code is obtained from the front-end page and it is determined whether there is an SMS verification code in the response packet, the method further includes: determining whether a request for password reset is initiated in the to-be-detected webpage, on determining that there is no SMS verification code in the response packet; replacing first preset user information in the request for password reset with second preset user information, to update the request for password reset, on determining that a request for password reset is initiated in the to-be-detected webpage; and determining whether the logic vulnerability allowing arbitrary password reset for an account exists in the to-be-detected webpage, based on whether a first response corresponding to the updated request for password reset is obtained.

In this embodiment, the determination on whether a request for password reset is initiated in the to-be-detected webpage is performed after obtaining, from the front-end page, the response packet sent in response to the request for a verification code and determining that there is no SMS verification code in the response packet.

Specifically, a process of identifying the request for password reset includes: determining whether a second request parameter exists; determining whether there is a pre-inputted SMS verification code in the second request parameter, on determining that the second request parameter exists; determining that there is a request for password reset initiated in the to-be-detected webpage, where the request for password reset includes an SMS verification code, on determining that there is a pre-inputted SMS verification code in the second request parameter; and determining that there is no request for password reset initiated in the to-be-detected webpage.

It should be noted that, on determining that the request for password reset is initiated by the to-be-detected webpage, the first preset user information in the request for password reset is replaced with the second preset user information, so that the request for password reset is updated. The updated request for password reset is sent to the system, and the first response from the system is obtained. It is determined whether any one of strings "1", "ok", "success", and "true" appears independently in the first response. Appearance of any one of the strings indicates that the request for password reset can be successfully responded even if the user information in the request for password reset is changed. In this case, it is determined that the logic vulnerability allowing arbitrary password reset for an account exists in the to-be-detected webpage. In a case that none of the strings appears, it is determined that the request for password reset is not successfully responded, and therefore it is determined that the logic vulnerability allowing arbitrary password reset for an account does not exist in the to-be-detected webpage.

In this embodiment, the user information in the request for password reset is modified, so that the request for password reset is reconstructed. Thereby, it can be determined comprehensively and accurately whether the logic vulnerability allowing arbitrary password reset for an account exists in the to-be-detected webpage.

On the basis of the above embodiments, the technical solution is further illustrated and optimized in this embodiment. In this embodiment, the method further includes: replacing an SMS verification code in the request for password reset with a random verification code, to update the request for password reset, on not receiving the first response; and determining whether the logic vulnerability allowing arbitrary password reset for an account exists in the to-be-detected webpage, based on whether a second response corresponding to the updated request for password reset is obtained.

In an implementation, the random verification code is generated in advance, and an exhaustive dictionary including the random verification code is constructed. Each random verification code in the exhaustive dictionary is used to replace the SMS verification code in the request for password reset, so that the request for password reset is updated. The updated request for password reset is sent to the system, and a second response from the system is obtained. It is determined whether any one of strings "1", "ok", "success", and "true" appears independently in the second response. Appearance of any one of the strings indicates that the request for password reset can be successfully responded even if the SMS verification code in the request for password reset is changed. In this case, it is determined that the logic vulnerability allowing arbitrary password reset for an account exists in the to-be-detected webpage. In a case that none of the strings appears, it is determined that the request for password reset is not responded successfully, and therefore it is determined that the logic vulnerability allowing arbitrary password reset for an account does not exist in the to-be-detected webpage.

In this embodiment, the SMS verification code in the request for password reset is modified, so that the request for password reset is reconstructed. Thereby, it can be determined comprehensively and accurately whether the logic vulnerability allowing arbitrary password reset for an account exists in the to-be-detected webpage.

On the basis of the above embodiments, the technical solution is further illustrated and optimized in this embodiment. In this embodiment, the method further include: determining whether the second response is determined within a preset time period; and determining that the logic vulnerability allowing arbitrary password reset for an account exists in the to-be-detected webpage, on determining that the second response is not determined within the preset time period.

It can be understood that, in practice, a period of validity may be set for the SMS verification code. In a case that the SMS verification code is inputted after the period of validity expires, the SMS verification code is invalid, so that the request for password reset fails. In an implementation, a time period from a moment when the SMS verification code is sent to a moment when the second response is obtained is recorded, so as to obtain a time period for determining the second response. It is determined whether the time period for determining the second response is within a preset range. That is, it is determined whether a random verification code resulting in a successful response from the system can be obtained by the to-be-detected webpage through an exhaustive method within the preset time period. In a case that the time period for obtaining a successful response through exhaustion exceeds the preset time period, it is determined that the SMS verification code does not have a period of validity. In this case, it is determined that the logic vulnerability allowing arbitrary password reset for an account exists in the to-be-detected webpage.

In this embodiment, it is determined whether a period of validity is set for the SMS verification code. Thereby, it can be determined comprehensively and accurately whether the logic vulnerability allowing arbitrary password reset for an account exists in the to-be-detected webpage.

As a preferred embodiment, the method further includes: determining a target random verification code corresponding to the second response, after obtaining the second response within the preset time period; performing a password reset operation for multiple times by using the request for password reset corresponding to the target random verification code, to obtain multiple third responses; and determining, based on the third responses, whether the logic vulnerability allowing arbitrary password reset for an account exists in the to-be-detected webpage.

In an implementation, after the second response is obtained within the preset time period, that is, after the SMS verification code in the request for password reset is updated by using a random verification code in the exhaustive manner and a response is successful, the target random verification code corresponding to the second response is determined based on the second response. The password reset operation is performed for multiple times based on the request for password reset corresponding to the target random verification code, so as to obtain multiple third responses. It is determined, for each of the third responses, whether the third response indicates a successful response to the request for password reset. In a case that there are more than two successful responses to the request for password reset, it is determined that the password reset operation can be performed for multiple times by using requests for password reset corresponding to a same target random verification code. However, a verification code has to be invalidated after used. Therefore, the method according the embodiment enables to determine whether the logic vulnerability allowing arbitrary password reset for an account exists in the to-be-detected webpage comprehensively and accurately.

On the basis of the above embodiments, the technical solution is further illustrated and optimized in this embodiment. In this embodiment, a process of generating the SMS verification code, the first preset user information, and the second preset user information includes: generating at least one of the SMS verification code, the first preset user information, or the second preset user information through a code receiving platform.

In an implementation, the SMS verification code is generated through the code receiving platform. The SMS verification code is inputted into a request form in the to-be-detected webpage through automatic code receiving, so that manual input by the user is avoided. Therefore, manual intervention is further reduced and human resources are saved.

In addition, the first preset user information and the second preset user information may be generated through the code receiving platform. The first preset user information and the second preset user information may be inputted through automatic code receiving. Therefore, the process of generating the request for password reset by using the first preset user information and replacing the first preset user information in the request for password reset with the second preset user information can be performed with reduced manual intervention, so that human resources are saved.

On the basis of the above embodiments, the technical solution is further illustrated and optimized in this embodiment. In this embodiment, the method further includes: recording a time instant when it is determined that the logic vulnerability allowing arbitrary password reset for an account exists in the to-be-detected webpage.

In an implementation, the time instant when it is determined that the logic vulnerability allowing arbitrary password reset for an account exists in the to-be-detected webpage is further obtained. The time instant and details of the logic vulnerability allowing arbitrary password reset for an account are recorded.

In this embodiment, the time instant when it is determined that the logic vulnerability allowing arbitrary password reset for an account exists in the to-be-detected webpage is recorded, so that details of the detection of the logic vulnerability allowing arbitrary password reset for an account in the to-be-detected webpage can be obtained in the future by viewing the recorded information. Therefore, user experience is improved.

Described above are details of the method for detecting a logic vulnerability allowing arbitrary password reset for an account according to the embodiments of the present disclosure. Correspondingly, an apparatus for detecting a logic vulnerability allowing arbitrary password reset for an account, and a computer-readable storage medium are further provided according to the present disclosure. Embodiments of the apparatus and the computer-readable storage medium correspond to the embodiments of the method. Therefore, the embodiments of the apparatus and the computer-readable storage medium may refer to the description of the embodiments of the method, which are not repeated here.

Figure 2:
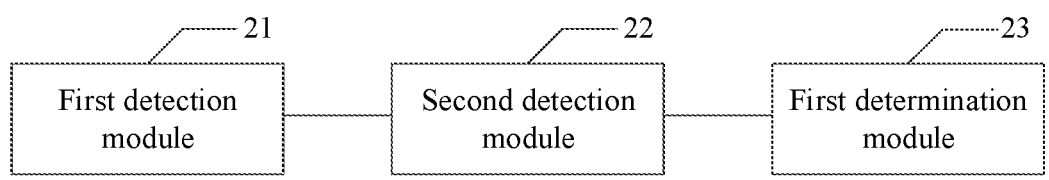
FIG. 2 is a structural diagram of an apparatus for detecting a logic vulnerability allowing arbitrary password reset for an account according to an embodiment of the present disclosure.

FIG. 2 is a structural diagram of an apparatus for detecting a logic vulnerability allowing arbitrary password reset for an account according to an embodiment of the present disclosure. As shown in FIG. 2, the apparatus includes a first detection module 21, a second detection module 22, and a first determination module 23.

The first detection module 21 is configured to invoke a preset identification program to determine whether a request for a verification code is initiated in a to-be-detected webpage, and trigger the second detection module 22 on determining that a request for a verification code is initiated in the to-be-detected webpage.

The second detection module 22 is configured to obtain, from a front-end page, a response packet sent in response to the request for a verification code, determine whether there is a short message service, SMS, verification code in the response packet, and trigger the first determination module 23 on determining that there is an SMS verification code in the response packet.

The first determination module 23 is configured to determine that the logic vulnerability allowing arbitrary password reset for an account exists in the to-be-detected webpage.

The apparatus according to the embodiment of the present disclosure has the same beneficial effects as the method for detecting a logic vulnerability allowing arbitrary password reset for an account.

As a preferred embodiment, the apparatus for detecting logic vulnerability allowing arbitrary password reset for an account further includes a third detection module, a first updating module, and a second determination module.

The third detection module is configured to determine whether a request for password reset is initiated in the to-be-detected webpage, in a case that there is no SMS verification code in the response packet; and trigger the first update module in a case that the request for password reset is initiated in the to-be-detected webpage.

The first updating module is configured to replace first preset user information in the request for password reset with second preset user information, to update the request for password reset.

The second determination module is configured to determine whether the logic vulnerability allowing arbitrary password reset for an account exists in the to-be-detected webpage, based on whether a first response corresponding to the updated request for password reset is obtained.

As a preferred embodiment, the apparatus further includes a second updating module, and a third determination module.

The second updating module is configured to replace an SMS verification code in the request for password reset with a random verification code to update the request for password reset, in a case that the first response is not obtained.

The third determination module is configured to determine whether the logic vulnerability allowing arbitrary password reset for an account exists in the to-be-detected webpage, based on whether a second response corresponding to the updated request for password reset is obtained.

As a preferred embodiment, the apparatus further includes a fourth detection module and a fourth determination module.

The fourth detection module is configured to determine whether the second response is determined within a preset time period, and trigger the fourth determination module in a case that the second response is not determined within the preset time period.

The fourth determination module is configured to determine that the logic vulnerability allowing arbitrary password reset for an account exists in the to-be-detected webpage.

As a preferred embodiment, the apparatus further includes a setting module, an updating module, and a fifth determination module.

The setting module is configured to determine a target random verification code corresponding to the second response, after the second response is obtained within the preset time period.

The updating module is configured to perform a password reset operation for a plurality of times by using the request for password reset corresponding to the target random verification code, to obtain multiple third responses.

The fifth determination module is configured to determine, based on the third responses, whether the logic vulnerability allowing arbitrary password reset for an account exists in the to-be-detected webpage.

As a preferred embodiment, the apparatus further includes a recording module.

The recording module is configured to record a time instant when it is determined that the logic vulnerability allowing arbitrary password reset for an account exists in the to-be-detected webpage.

Figure 3:
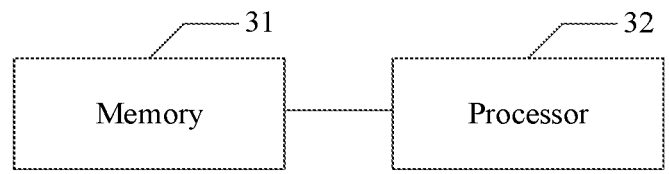
FIG. 3 is a structural diagram of an apparatus for detecting a logic vulnerability allowing arbitrary password reset for an account according to another embodiment of the present disclosure.

FIG. 3 is a structural diagram of an apparatus for detecting a logic vulnerability allowing arbitrary password reset for an account according to another embodiment of the present disclosure. As shown in FIG. 3, the apparatus includes a memory 31 and a processor 32.

The memory 31 stores a computer program.

The processor 32 is configured to execute the computer program. The computer program, when executed by the processor, configures the apparatus to implement the method for detecting a logic vulnerability allowing arbitrary password reset for an account.

The apparatus according to the embodiment of the present disclosure has the same beneficial effects as the method for detecting a logic vulnerability allowing arbitrary password reset for an account.

In order to solve the above-mentioned technical problems, a computer-readable storage medium is further provided according to an embodiment of the present disclosure. A computer program is stored on the computer-readable storage medium. The computer program, when executed by a processor, is configured to implement the method for detecting a logic vulnerability allowing arbitrary password reset for an account.

The computer-readable storage medium has the same beneficial effects as the method for detecting a logic vulnerability allowing arbitrary password reset for an account.

Hereinabove described are the method and the apparatus for detecting a logic vulnerability allowing arbitrary password reset for an account and the computer-readable storage according to embodiments of the present disclosure. Specific examples are provided to explain principles and embodiments of the present disclosure, and the above description of the embodiments is only used to facilitate understanding of the method and core concept of the present disclosure. It should be noted that those skilled in the art can make various improvements and modifications to the present disclosure without departing from the principle of the present disclosure, and these improvements and modifications shall fall within the protection scope of the present disclosure.

Herein the embodiments are described in a progressive manner. Each of the embodiments focuses on differences with other embodiments, and the same and similar parts of the embodiments can be referred to each other. Description of the apparatus disclosed in the embodiments is simple, as the apparatus corresponds to the method disclosed in the embodiments. Reference may be made to corresponding description of the method for details of the apparatus.

It may be further understood by those skilled in the art that examples of units and algorithm steps described in combination with the disclosed embodiments may be implemented by electronic hardware, computer software or a combination thereof. In order to clearly describe interchangeability of the hardware and the software, the examples are generally described above in view of their functions. Whether the functions being implemented by the hardware or by the software depends on applications of the technical solution and design constraint conditions. Those skilled in the art may use different methods for each particular application to implement the described functions, but such implementation should not be considered as going beyond the scope of the present disclosure.

The invention claimed is:

1. A method for detecting a logic vulnerability allowing arbitrary password reset for an account, comprising:
   invoking a preset identification program to determine whether a request for a verification code is initiated in a to-be-detected webpage;
   obtaining, from a front-end page, a response packet sent in response to the request for a verification code, and determining whether there is a short message service (SMS) verification code in the response packet, on determining that a request for a verification code is initiated in the to-be-detected webpage;
   determining that the logic vulnerability allowing arbitrary password reset for an account exists in the to-be-detected webpage, on determining that there is an SMS verification code in the response packet;
   determining whether a request for password reset is initiated in the to-be-detected webpage, on determining that there is no SMS verification code in the response packet;
   replacing first preset user information in the request for password reset with second preset user information, to update the request for password reset, on determining that a request for password reset is initiated in the to-be-detected webpage; and
   determining whether the logic vulnerability allowing arbitrary password reset for an account exists in the to-be-detected webpage, based on a first response to the updated request for password reset.

2. The method according to claim 1, further comprising:
   replacing an SMS verification code in the request for password reset with a random verification code, to update the request for password reset, on not receiving the first response; and
   determining whether the logic vulnerability allowing arbitrary password reset for an account exists in the to-be-detected webpage, based on a second response to the updated request for password reset.

3. The method according to claim 2, further comprising:
   determining whether the second response obtained within a preset time period; and
   determining that the logic vulnerability allowing arbitrary password reset for an account exists in the to-be-detected webpage, on determining that the second response is not obtained within a preset time period.

4. The method according to claim 3, further comprising:
   determining a target random verification code corresponding to the second response, after obtaining the second response within the preset time period;
   performing a password reset operation for a plurality of times by using the request for password reset corresponding to the target random verification code, to obtain a plurality of third responses; and
   determining, based on the third responses, whether the logic vulnerability allowing arbitrary password reset for an account exists in the to-be-detected webpage.

5. The method according to claim 3, wherein
at least one of the SMS verification code, the first preset user information, or the second preset user information is generated through a code receiving platform.

6. The method according to claim 1, further comprising:
recording a time instant when it is determined that the logic vulnerability allowing arbitrary password reset for an account exists in the to-be-detected webpage.

7. An apparatus for detecting a logic vulnerability allowing arbitrary password reset for an account, comprising:
a memory storing a computer program; and
a processor, wherein
the computer program, when executed by the processor, configures the apparatus to
invoke a preset identification program to determine whether a request for a verification code is initiated in a to-be-detected webpage;
obtain, from a front-end page, a response packet sent in response to the request for a verification code, and determine whether there is a short message service (SMS) verification code in the response packet, on determining that a request for a verification code is initiated in the to-be-detected webpage;
determine that the logic vulnerability allowing arbitrary password reset for an account exists in the to-be-detected webpage, on determining that there is an SMS verification code in the response packet;
determine whether a request for password reset is initiated in the to-be-detected webpage, on determining that there is no SMS verification code in the response packet;
replace first preset user information in the request for password reset with second preset user information, to update the request for password reset, on determining that a request for password reset is initiated in the to-be-detected webpage; and
determine whether the logic vulnerability allowing arbitrary password reset for an account exists in the to-be-detected webpage, based on a first response to the updated request for password reset.

8. A computer-readable storage medium, wherein the computer-readable storage medium stores a computer program, and the computer program, when executed by a processor, is configured to
invoke a preset identification program to determine whether a request for a verification code is initiated in a to-be-detected webpage;
obtain, from a front-end page, a response packet sent in response to the request for a verification code, and determine whether there is a short message service (SMS) verification code in the response packet, on determining that a request for a verification code is initiated in the to-be-detected webpage;
determine that the logic vulnerability allowing arbitrary password reset for an account exists in the to-be-detected webpage, on determining that there is an SMS verification code in the response packet;
determine whether a request for password reset is initiated in the to-be-detected webpage, on determining that there is no SMS verification code in the response packet;
replace first preset user information in the request for password reset with second preset user information, to update the request for password reset, on determining that a request for password reset is initiated in the to-be-detected webpage; and
determine whether the logic vulnerability allowing arbitrary password reset for an account exists in the to-be-detected webpage, based on a first response to the updated request for password reset.

9. The apparatus according to claim 7, further configured to:
replace an SMS verification code in the request for password reset with a random verification code, to update the request for password reset, on not receiving the first response; and
determine whether the logic vulnerability allowing arbitrary password reset for an account exists in the to-be-detected webpage, based on a second response to the updated request for password reset.

10. The apparatus according to claim 9, further configured to:
determine whether the second response is obtained within a preset time period; and
determine that the logic vulnerability allowing arbitrary password reset for an account exists in the to-be-detected webpage, on determining that the second response is not obtained within the preset time period.

11. The apparatus according to claim 10, further configured to:
determine a target random verification code corresponding to the second response, after obtaining the second response within the preset time period;
perform a password reset operation for a plurality of times by using the request for password reset corresponding to the target random verification code, to obtain a plurality of third responses; and
determine, based on the third responses, whether the logic vulnerability allowing arbitrary password reset for an account exists in the to-be-detected webpage.

12. The apparatus according to claim 9, further configured to:
record a time instant when it is determined that the logic vulnerability allowing arbitrary password reset for an account exists in the to-be-detected webpage.

13. The computer-readable storage medium according to claim 8, wherein the computer program, when executed by the processor, is further configured to:
replace an SMS verification code in the request for password reset with a random verification code, to update the request for password reset, on not receiving the first response; and
determine whether the logic vulnerability allowing arbitrary password reset for an account exists in the to-be-detected webpage, based on a second response to the updated request for password reset.

14. The computer-readable storage medium according to claim 13, wherein the computer program, when executed by the processor, is further configured to:
determine whether the second response is obtained within a preset time period; and
determine that the logic vulnerability allowing arbitrary password reset for an account exists in the to-be-detected webpage, on determining that the second response is not obtained within the preset time period.

15. The computer-readable storage medium according to claim 14, wherein the computer program, when executed by the processor, is further configured to:
determine a target random verification code corresponding to the second response, after obtaining the second response within the preset time period;
perform a password reset operation for a plurality of times by using the request for password reset corresponding to the target random verification code, to obtain a plurality of third responses; and determine, based on the third responses, whether the logic vulnerability allowing arbitrary password reset for an account exists in the to-be-detected webpage.

16. The computer-readable storage medium according to claim 10, wherein the computer program, when executed by the processor, is further configured to:

record a time instant when it is determined that the logic vulnerability allowing arbitrary password reset for an account exists in the to-be-detected webpage.

* * * * *